(12) United States Patent
Mukoyama et al.

(10) Patent No.: US 8,019,188 B2
(45) Date of Patent: Sep. 13, 2011

(54) OPTICAL TRANSMISSION APPARATUS

(75) Inventors: Naotaka Mukoyama, Tokyo (JP); Kazuhiro Sakai, Kanagawa (JP); Hiroki Sugibuchi, Kanagawa (JP); Akira Sakamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 112 days.

(21) Appl. No.: 12/468,942

(22) Filed: May 20, 2009

(65) Prior Publication Data
US 2010/0129038 A1  May 27, 2010

(30) Foreign Application Priority Data

Nov. 21, 2008  (JP) .................. 2008-298256

(51) Int. Cl.
  *G02B 6/32*  (2006.01)
  *G02B 6/26*  (2006.01)
  *G02B 6/36*  (2006.01)
  *G02B 6/42*  (2006.01)

(52) U.S. Cl. ............... 385/35; 385/31; 385/33; 385/38; 385/48; 385/93

(58) Field of Classification Search ............ 385/35, 385/38, 93
See application file for complete search history.

(56) References Cited

U.S. PATENT DOCUMENTS

| | | | |
|---|---|---|---|
| 4,092,061 A * | 5/1978 | Stigliani, Jr. .................. 385/33 |
| 5,337,397 A * | 8/1994 | Lebby et al. .................. 385/93 |
| 5,586,208 A | 12/1996 | Nishiyama |
| 5,926,592 A * | 7/1999 | Harris et al. .................. 385/33 |
| 6,529,661 B2 * | 3/2003 | Kropp .................. 385/38 |
| 6,671,432 B2 * | 12/2003 | Imada et al. .................. 385/33 |
| 6,709,607 B2 * | 3/2004 | Hibbs-Brenner et al. ...... 216/24 |
| 6,856,728 B2 * | 2/2005 | Zhang .................. 385/33 |
| 7,057,158 B2 * | 6/2006 | Luo .................. 250/227.24 |
| 7,189,007 B2 * | 3/2007 | Imanbayev et al. .................. 385/77 |
| 7,404,679 B2 * | 7/2008 | Ebbutt et al. .................. 385/78 |
| 7,460,747 B2 * | 12/2008 | Tanaka et al. .................. 385/31 |
| 7,680,378 B2 * | 3/2010 | Alphonse et al. .................. 385/119 |
| 7,720,332 B2 * | 5/2010 | Park et al. .................. 385/33 |
| 2001/0038737 A1 * | 11/2001 | Imada et al. .................. 385/33 |
| 2002/0076157 A1 * | 6/2002 | Kropp .................. 385/38 |
| 2005/0286831 A1 * | 12/2005 | Ohtsu et al. .................. 385/31 |
| 2007/0140615 A1 * | 6/2007 | Tanaka et al. .................. 385/31 |

FOREIGN PATENT DOCUMENTS

| | | |
|---|---|---|
| JP | 06-021485 | 1/1994 |
| JP | 08-018077 | 1/1996 |
| JP | 11-017211 | 1/1999 |

* cited by examiner

*Primary Examiner* — Rhonda Peace
(74) *Attorney, Agent, or Firm* — Fildes & Outland, P.C.

(57) ABSTRACT

An optical transmission apparatus includes a light receiving element and an optical waveguide. The light receiving element receives light. The optical waveguide includes a core, a clad and a concave portion. The clad is adjacent to the core. The concave portion is formed in a portion of the core or a portion of the clad and diffuses the light. The portion of the core or the portion of the clad emits the light toward the light receiving element.

9 Claims, 9 Drawing Sheets

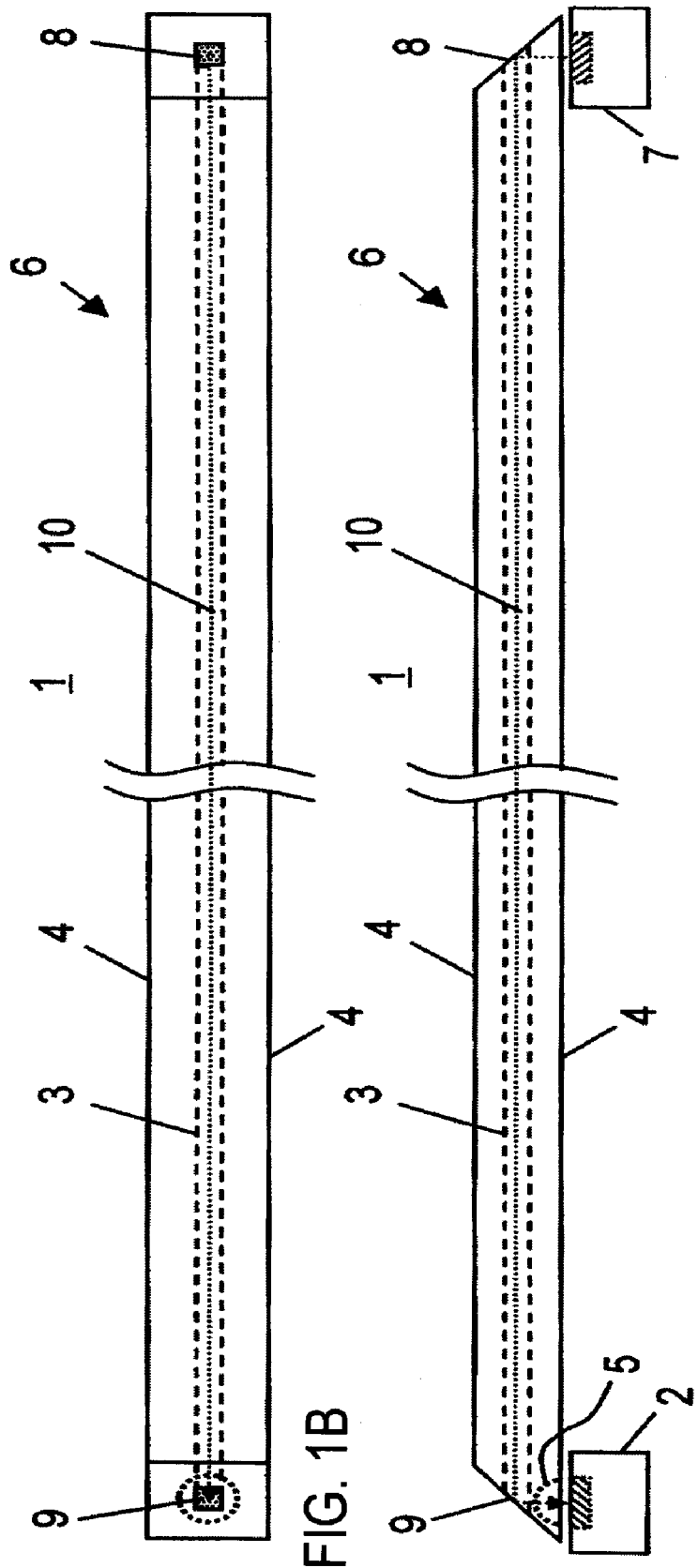

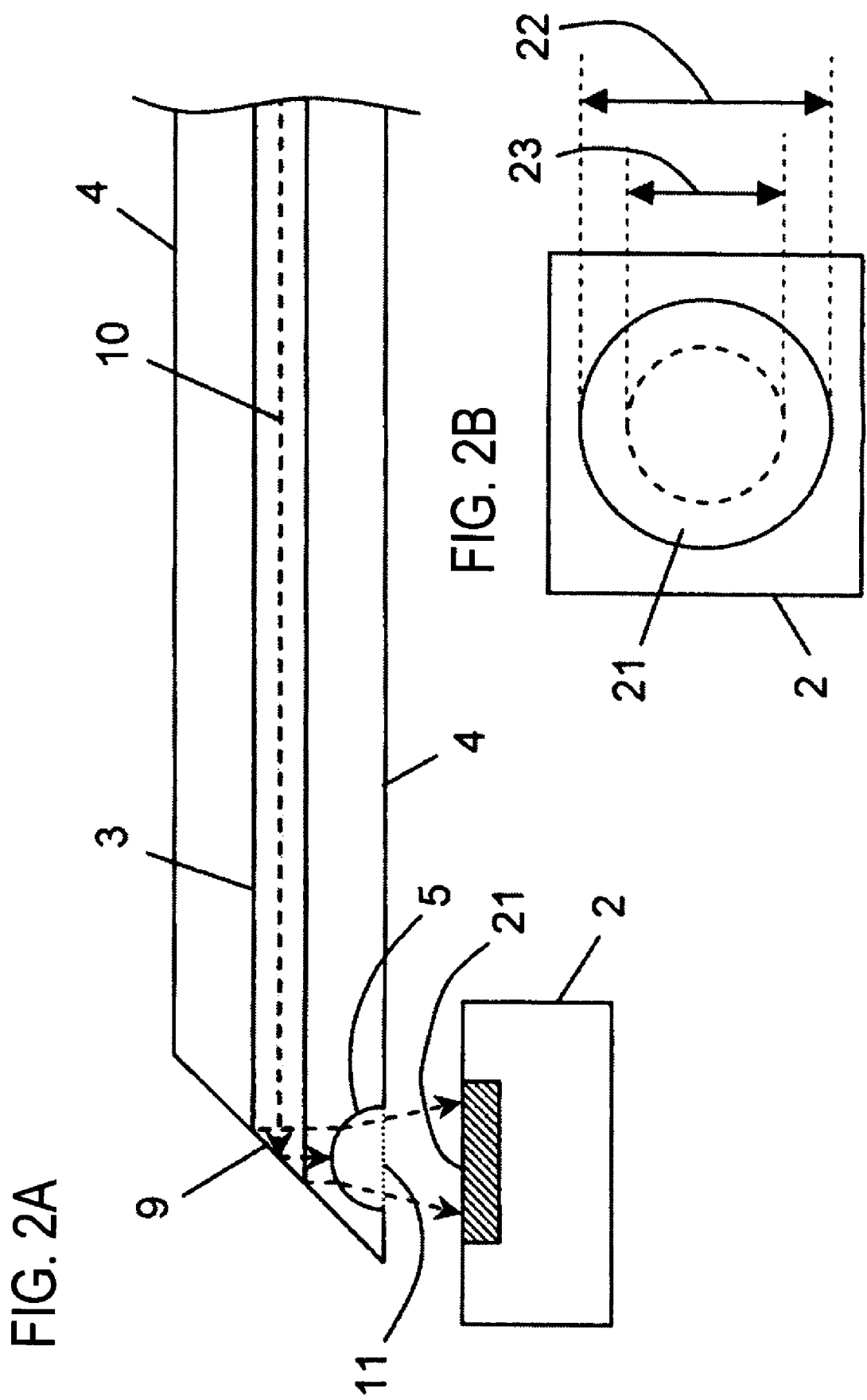

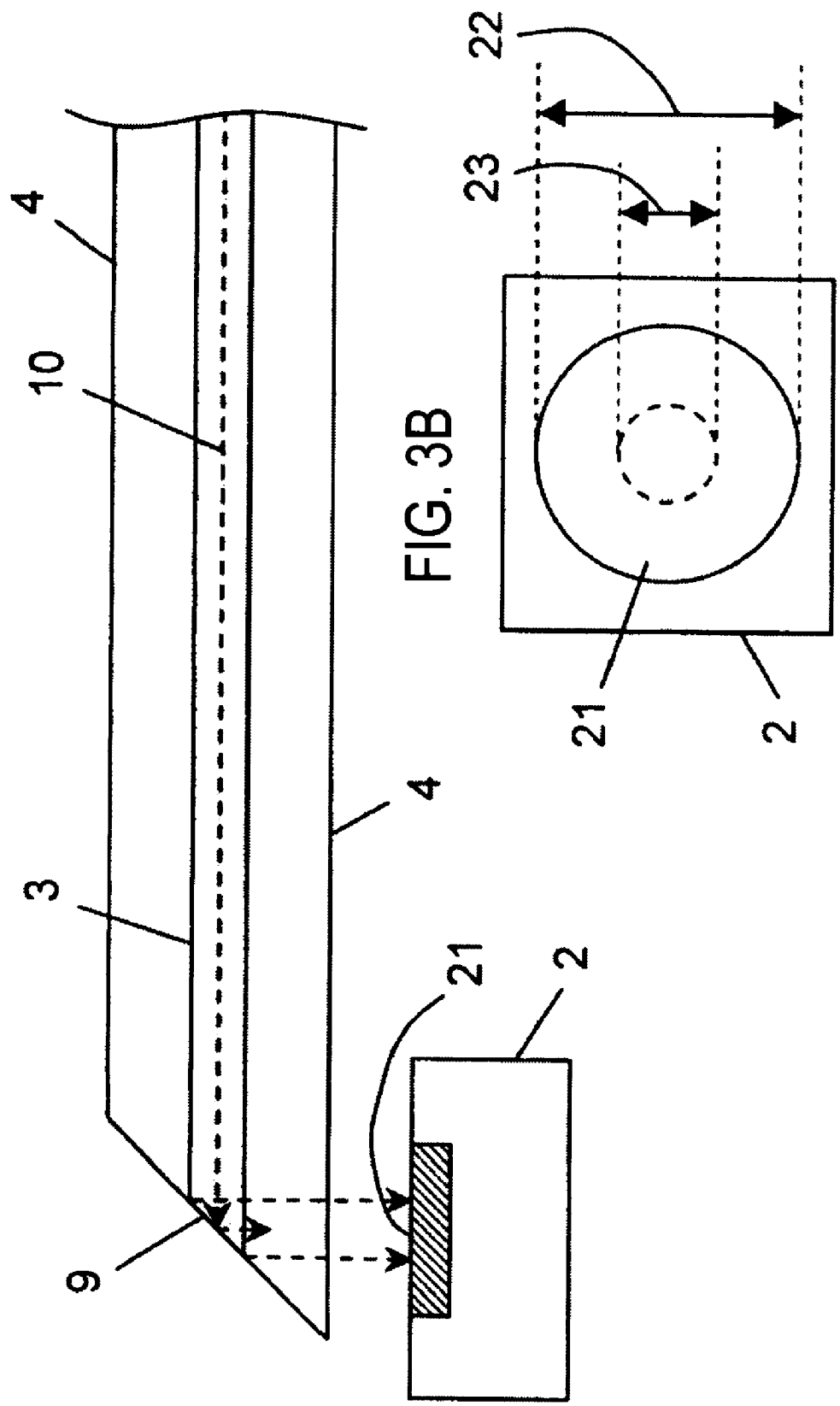

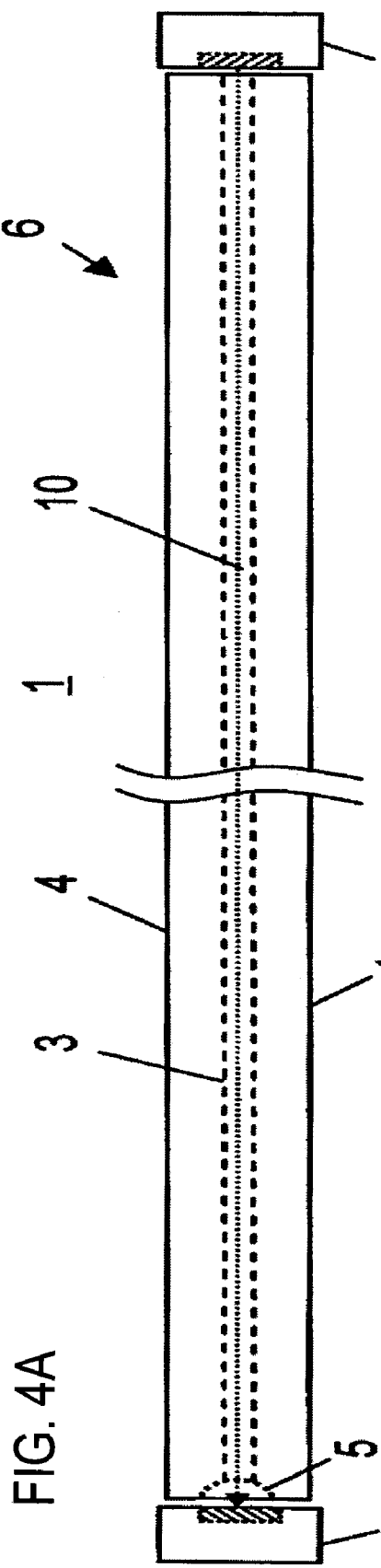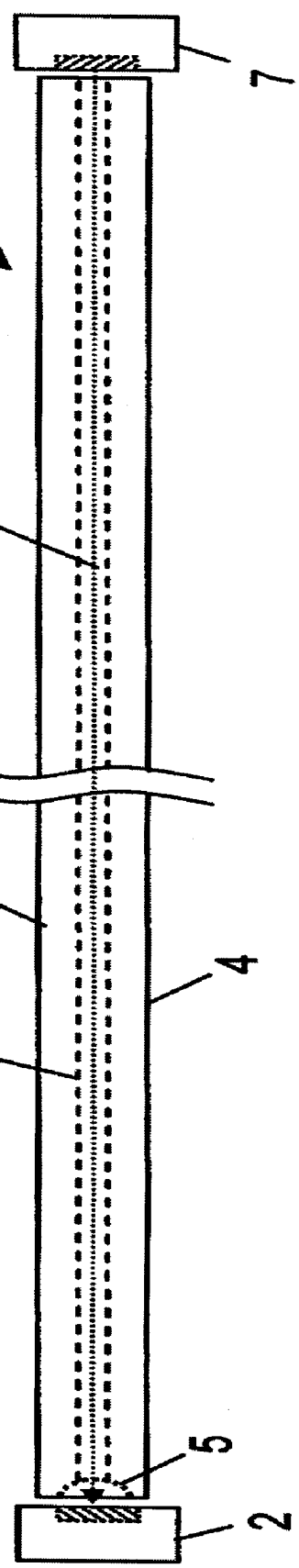

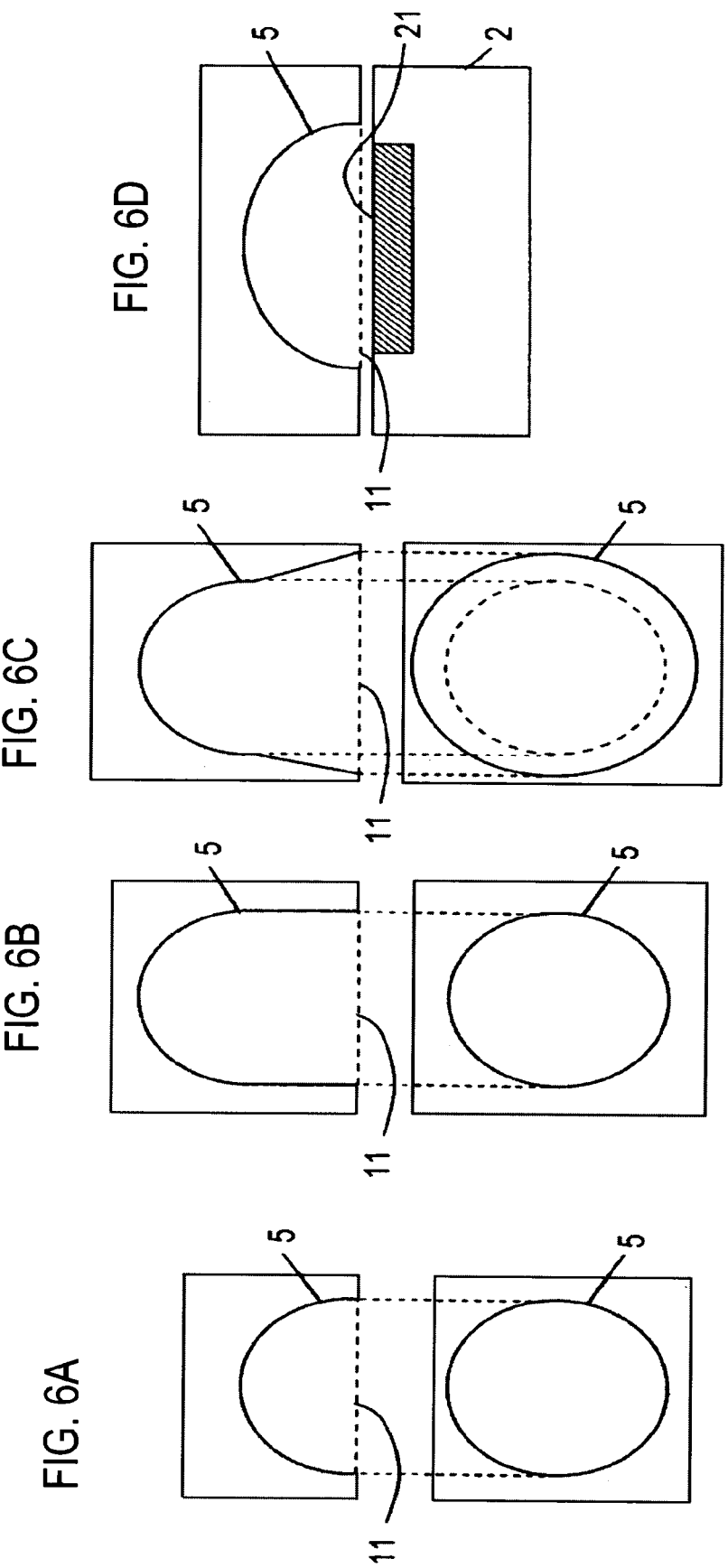

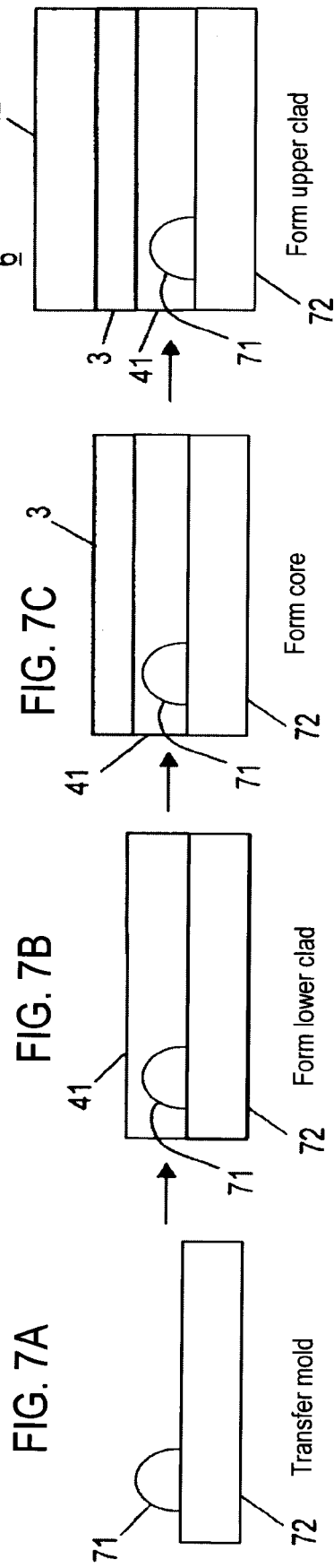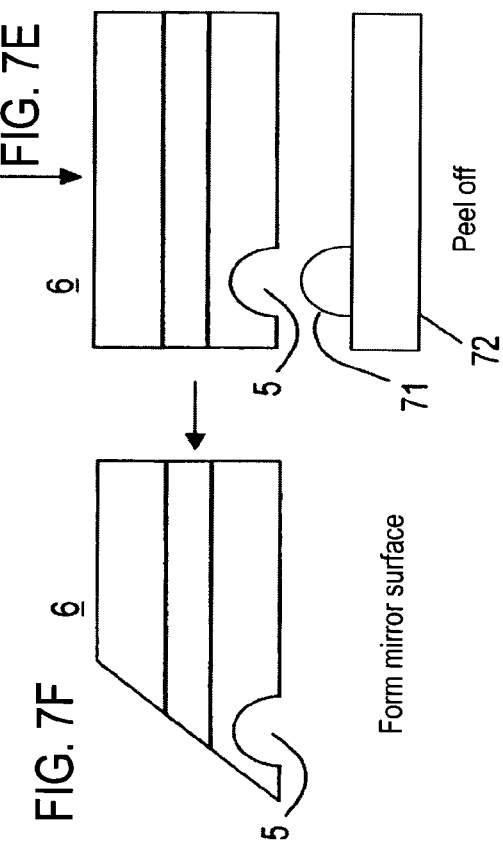

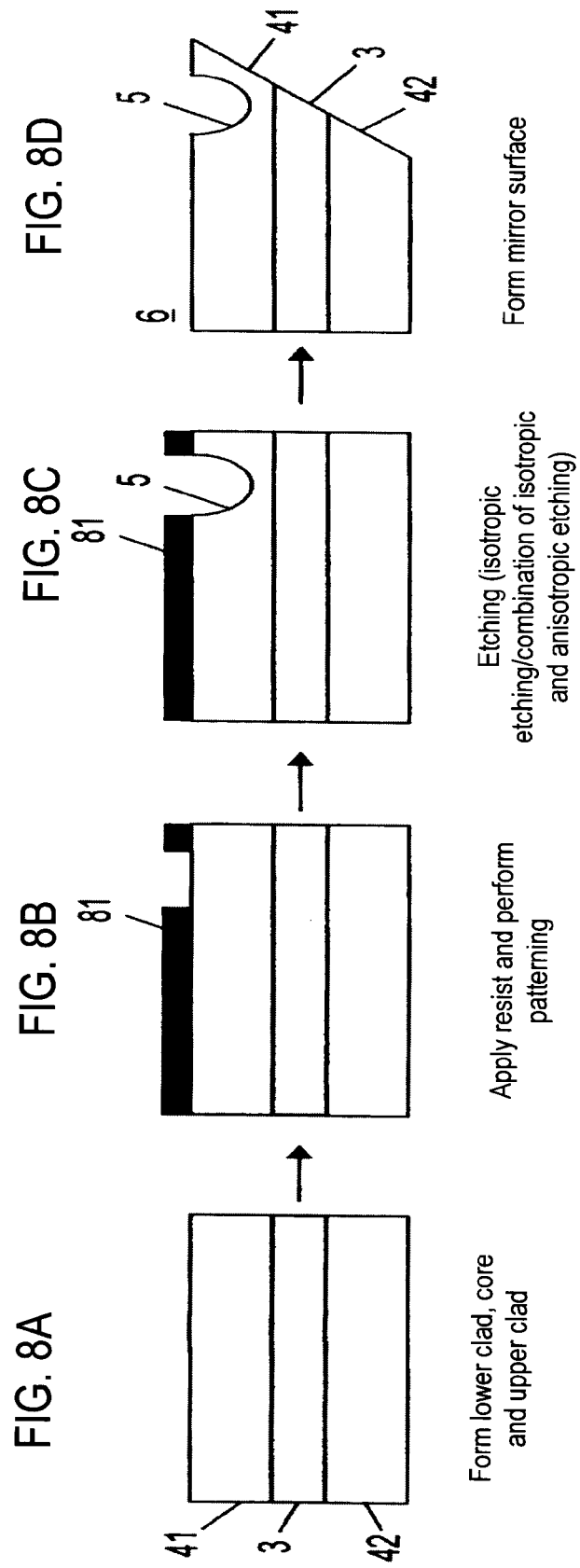

OPTICAL TRANSMISSION APPARATUS

CROSS-REFERENCE TO RELATED APPLICATIONS

This application is based on and claims priority under 35 USC 119 from Japanese Patent Application No. 2008-298256 filed on Nov. 21, 2008.

BACKGROUND

1. Technical Field

The invention relates to an optical transmission apparatus.

2. Related Art

A transmission apparatus such as an optical module including an optical transmission medium and an optical device has been used in various fields. For example, in the field of a mobile phone, it has been increasingly required to change a signal transmission between internal circuits into light signal transmission as a countermeasure against requirement of higher speed for a short distance transmission in a mobile apparatus and a countermeasure against an electromagnetic noise.

SUMMARY

According to an aspect of the invention, an optical transmission apparatus includes a light receiving element and an optical waveguide. The light receiving element receives light. The optical waveguide includes a core, a clad and a concave portion. The clad is adjacent to the core. The concave portion is formed in a portion of the core or a portion of the clad and diffuses the light. The portion of the core or the portion of the clad emits the light toward the light receiving element.

BRIEF DESCRIPTION OF THE DRAWINGS

Exemplary embodiments of the invention will be described in detail below based on the accompanying drawings, wherein:

FIGS. 1A and 1B are views showing an optical transmission apparatus according to an exemplary embodiment of the invention, FIG. 1A being a plan view and FIG. 1B being a side view;

FIGS. 2A and 2B are views for explaining an example of optical coupling between an end portion of an optical waveguide and a light receiving element according to the exemplary embodiment shown in FIGS. 1A and 1B, FIG. 2A being a section view and FIG. 2B being a plan view of the light receiving element;

FIGS. 3A and 3B are views for explaining an example of optical coupling between an end portion of an optical waveguide and a light receiving element in the case where a concave portion is not provided, FIG. 3A being a section view and FIG. 3B being a plan view of the light receiving element;

FIGS. 4A and 4B are views showing the optical transmission apparatus according to another exemplary embodiment of the invention, FIG. 4A being a plan view and FIG. 4B being a side view;

FIGS. 6A to 6D are views illustrating examples of a shape of the concave portion formed in an optical waveguide;

FIGS. 7A to 7F are views showing an example of a method for manufacturing the optical transmission apparatus according to the exemplary embodiment of the invention;

FIGS. 8A to 8D are views showing another example of the method for manufacturing the optical transmission apparatus according to the exemplary embodiment of the invention.

DETAILED DESCRIPTION

Figure 5:
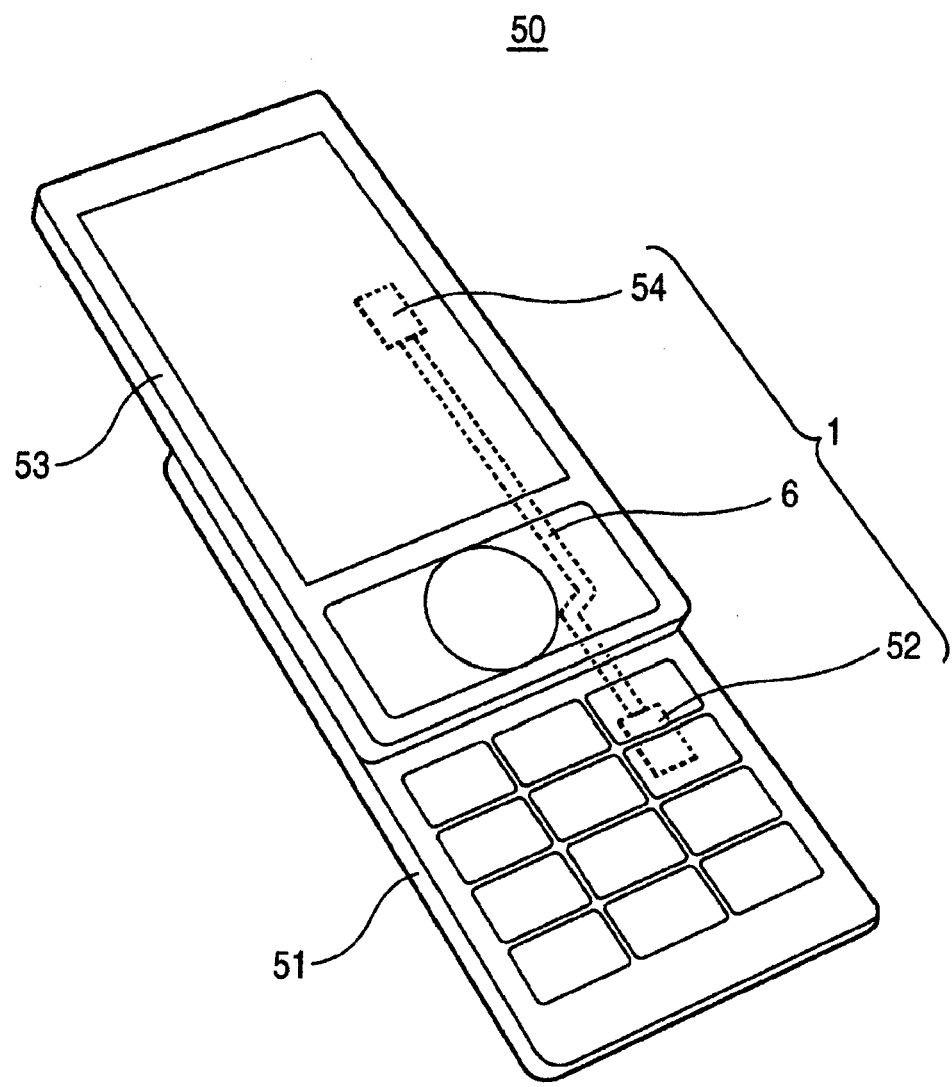
FIG. 5 is a view showing an example in which the optical transmission apparatus according to any of the exemplary embodiments of the invention is applied to a mobile phone.

FIGS. 1A and 1B are views showing an optical transmission apparatus according to an exemplary embodiment of the invention. FIG. 1A is a plan view, and FIG. 1B is a side view. As shown in FIG. 1, the optical transmission apparatus 1 includes a light receiving element 2 for receiving light and an optical waveguide 6. The optical waveguide 6 includes a core 3, a clad 4 adjacent to the core 3, and a concave portion 5. The concave portion 5 is formed in a portion of the clad 4 and diffuses light. The portion of the clad 4 emits light toward the light receiving element 2. The concave portion 5 is concave toward the core 3. 45-degree inclined surfaces are formed in both end portions of the optical waveguide 5 according to this exemplary embodiment. However, for example, an angle of the inclined surface is not limited thereto. The inclined surfaces may not be provided in the both ends of the optical waveguide 6 as will be described later. In this exemplary embodiment, the light receiving element 2 is provided in one end of the optical waveguide 6, and a light emitting element 7 is provided in the other end. The light receiving element 2 is a photodiode (PD), for example. Also, the light emitting element 7 is a surface emitting laser such as a VCSEL in which a spot diameter of emitted light has a circular shape, for example. However, the respective elements are not limited thereto.

The light emitted from the light emitting element 7 is received by a light receiving surface of the optical waveguide 6 and is reflected by an inclined surface 8 of the core 3. Then, the reflected light propagates in the core 3 along an optical transmission path 10 and is reflected by an inclined surface 9 of the core 3 at an opposite side. The light beam thus reflected is diffused by a concave lens effect provided by the concave portion 5 formed in the clad 4. The diffused light is received by the light receiving element 2. The light emitting element 7 is not essential. For example, another element for introducing light into the optical waveguide 6, for example, another optical waveguide or an optical fiber may be provided. The single core 3 is provided in the optical waveguide 6 in this exemplary embodiment. However, the number of the cores 3 is not limited to one. Plural cores 3 may be provided. In this case, the concave portions 5 and the light receiving elements 2 are provided for the respective cores 3. Moreover, an electric circuit such as an amplifier is connected to the light receiving element 2, for example, and an electric circuit such as a driving circuit is connected to the light emitting element 7, which is not shown.

FIGS. 2A and 2B are views for explaining an example of optical coupling between the end portion of the optical waveguide and the light receiving element according to the exemplary embodiment of FIGS. 1A and 1B. FIG. 2A is a section view, and FIG. 2B is a plan view of the light receiving element. As shown in FIGS. 2A and 2B, the light propagating along the optical transmission path 10 in the core 3 is reflected by the inclined surface 9 formed in the end surface of the core 3 and is received by the light receiving element 2 through the concave portion 5 formed in the clad 4. At this time, the concave portion 5 diffuses a light beam and irradiates the diffused light beam onto a light receiving surface 21 of the light receiving element 2 by the concave lens effect. In this exemplary embodiment, thus, a lens function is integrated with the optical waveguide. A spot diameter to be irradiated onto the light receiving surface 21 may be varied by adjusting a radius of curvature of the concave portion 5. A spot diameter 23 formed on the light receiving element 21 by the light emitted through the concave portion 5 is suitably set to be equal to or greater than a half of a light receiving diameter 22 of the light receiving element 2. The concave portion 5 and the light receiving element 2 are disposed with a gap between an opening surface 11 of the concave portion 5 and the light receiving surface 21 of the light receiving element 2 in this exemplary embodiment. However, the opening surface 11 of the concave portion 5 and the light receiving surface 21 of the light receiving element 2 may be in close contact with each other.

FIGS. 3A and 3B are views for explaining an example of optical coupling between an end portion of an optical waveguide and a light receiving element in the case where no concave portion is provided. FIG. 3A is a section view, and FIG. 3B is a plan view of the light receiving element. As shown in FIG. 3, light propagating along the optical transmission path 10 in the core 3 is reflected by the inclined surface 9 formed in the end surface of the core 3 and is received by the light receiving element 2 through the clad 4 having no concave portion. At this time, since no concave portion is provided, a light beam is irradiated onto the light receiving surface 21 of the light receiving element 2 without diffusion. Accordingly, the spot diameter 23 is smaller than that in FIG. 2.

For example, it is assumed that the light receiving diameter 22 of the light receiving element 2 is 150 μm and that a core diameter of the core 3 is 50 μm. In this case, if no concave portion is provided as shown in FIG. 3A, the light beam emitted from the optical waveguide 6 is irradiated onto the light receiving surface 21 as it is. Therefore, the spot diameter 23 is 50 μm, which is equal to the core diameter. On the other hand, if the concave portion 5 is provided in the optical waveguide 6 as shown in FIG. 2A, it is possible to increase the spot diameter 23 on the light receiving surface 21 to be 90 μm by adjusting the radius of curvature of the concave portion 5, for example. When the spot diameter is increased, electron-hole pairs generated locally are decreased as compared with the case in which the spot diameter is not increased. Consequently, a voltage drop (a space charge effect) in a depletion layer due to space charges is suppressed so that a voltage is made uniform and a signal distortion is reduced.

FIGS. 4A and 4B are views showing the optical transmission apparatus according to another exemplary embodiment of the invention. FIG. 4A is a plan view, and FIG. 4B is a side view. This exemplary embodiment is different from the exemplary embodiment shown in FIGS. 1A and 1B in that an end portion of an optical waveguide 6 has no inclined surface but a concave portion 5 is formed on one end portion of a core 3 in the optical waveguide 6. The other respects are the same as those in the exemplary embodiment shown in FIGS. 1A and 1B. As shown in FIGS. 4A and 4B, the concave portion 5 formed in the end portion of the core 3 is concave toward the core 3, and a peripheral edge portion thereof may be extended to a clad 4 that is adjacent to the core 3. In this exemplary embodiment, moreover, a light receiving element 2 is provided in one end of the optical waveguide 6, and a light emitting element 7 is provided on the other end as shown in FIGS. 4A and 4B. Light emitted from the light emitting element 7 is incident on the end portion of the core 3 which serves as a light receiving surface of the optical waveguide 6, and propagates in the core 3 along an optical transmission path 10 and is diffused by a concave lens effect provided by the concave portion 5 formed in the end portion of the core 3 at an opposite side. Then, the light is received by the light receiving element 2. In this case, by adjusting a radius of curvature of the concave portion 5, it is possible to increase a spot diameter on a light receiving surface 21 of the light receiving element to be a preset size.

FIG. 5 is a view showing an example in which the light emitting apparatus according to any of the exemplary embodiments of the invention is applied to a mobile phone. The optical transmission apparatus 1 is disposed in a mobile phone 50. In FIG. 5, the optical transmission apparatus 1 is illustrated with an emphasis in order to easily understand how it is arranged. As shown in FIG. 5, a transmitter 52 including the light emitting element 7 is provided in an operating portion 51 of the mobile phone, and a receiver 54 including the light receiving element 2 is provided in a display portion 53. The transmitter 52 and the receiver 54 are optically connected to each other through the optical waveguide 6. In this exemplary embodiment, an operation signal based on an operation of the operating portion 51 is sent from the transmitter 52 through the optical waveguide 6 in the form of an optical signal and is received by the receiver 54, and is thus displayed on the display portion 53. In this case, a signal distortion can be reduced by using the optical transmission apparatus 1.

FIGS. 6A to 6D are views illustrating examples of a shape of the concave portion formed in the optical waveguide. In FIGS. 6A to 6C, upper portions are section views showing the concave portion 5, and lower portions show the opening surface 11 of the concave portion 5. The concave portion 5 shown in FIG. 6A has a circular arc in the section view and has a circular shape in the plane view. A planar shape of the concave portion 5 according to this example is changed by varying a radius of curvature of the circular arc. The concave portion 5 shown in FIG. 6B has a circular arc in a central part of the section view and keeps the width of the circular arc in a side part of the section view. The concave portion 5 of this example can maintain the planar shape as it is even if the radius of curvature of the circular arc is varied. The concave portion 5 shown in FIG. 6C has a circular arc in a central part of the section view and gradually expands from the width of the circular arc in a side part of the section view. The concave portion 5 of this example can also maintain the planar shape as it is if the radius of curvature of the circular art is varied. FIG. 6D shows a relationship between the opening surface 11 of the concave portion 5 and the light receiving surface 21 of the light receiving element 2. In this exemplary embodiment, a size of the opening surface 11 of the concave portion 5 is set to be larger than that of the light receiving surface 21 of the light receiving element 2 as shown FIG. 6D so that the light receiving surface 21 of the light receiving element 2 does not collide with the optical waveguide 6. The section shape of the concave portion 5 is not limited to the circular arc of the circular shape but may be an elliptical arc, for example. The section shape of the concave portion 5 may have any shape so long as the concave portion 5 has a function for diffusing a light beam to increase a beam diameter. Moreover, a shape of the opening surface 11 of the concave portion 5 is not limited to a circle, but may be any shape so long as the opening surface 11 can emit the diffused light beam without a bad influence.

FIGS. 7A to 7F are views showing an example of a method for manufacturing the optical transmission apparatus according to the exemplary embodiment of the invention. In the exemplary embodiment, a stamper method is illustrated. At first, as a transfer mold, a substrate 72 having a protrusion portion 71 (an inverted shape of the concave portion 5) is prepared as shown in FIG. 7A. As shown in FIG. 7B, next, a lower clad 41 is formed on the substrate 72 having the protrusion portion 71. As shown in FIG. 7C, subsequently, a core 3 is formed on the lower clad 41. As shown in FIG. 7D, then, an upper clad 42 is formed on the core 3. As shown in FIG. 7E, thereafter, the substrate 72 having the protrusion portion 71 is peeled off from the lower clad 41. Consequently, there is provided the optical waveguide 6 having the concave portion 5 in a portion of the lower clad 41 that corresponds to the protrusion portion 71. As shown in FIG. 7F, next, an inclined surface (a mirror surface) is formed in an end portion of the optical waveguide 6 by the laser processing. Thereby, the optical waveguide 6 shown in FIG. 1 is manufactured.

FIGS. 8A to 8D are views showing another example of the method for manufacturing the optical transmission apparatus according to the exemplary embodiment of the invention. In this example, an etching method is illustrated. At first, as shown in FIG. 8A, an optical waveguide 6 having a lower clad 41, a core 3 and an upper clad 42 is formed. As shown in FIG. 8B, next, a resist is applied onto the lower clad 41 except for a position in which a concave portion 5 is to be formed, and the lower clad 41 is subjected to patterning. As shown in FIG. 8C, subsequently, isotropic etching or a combination of isotropic etching and anisotropic etching is performed for the lower clad 41 thus patterned to form the concave portion 5. As shown in FIG. 8D, then, the resist provided on the lower clad 41 is removed, and an inclined surface (a mirror surface) is formed on an end portion of the optical waveguide 6 by the laser processing. Consequently, the optical waveguide 6 shown in FIG. 1 is manufactured.

Figure 9:
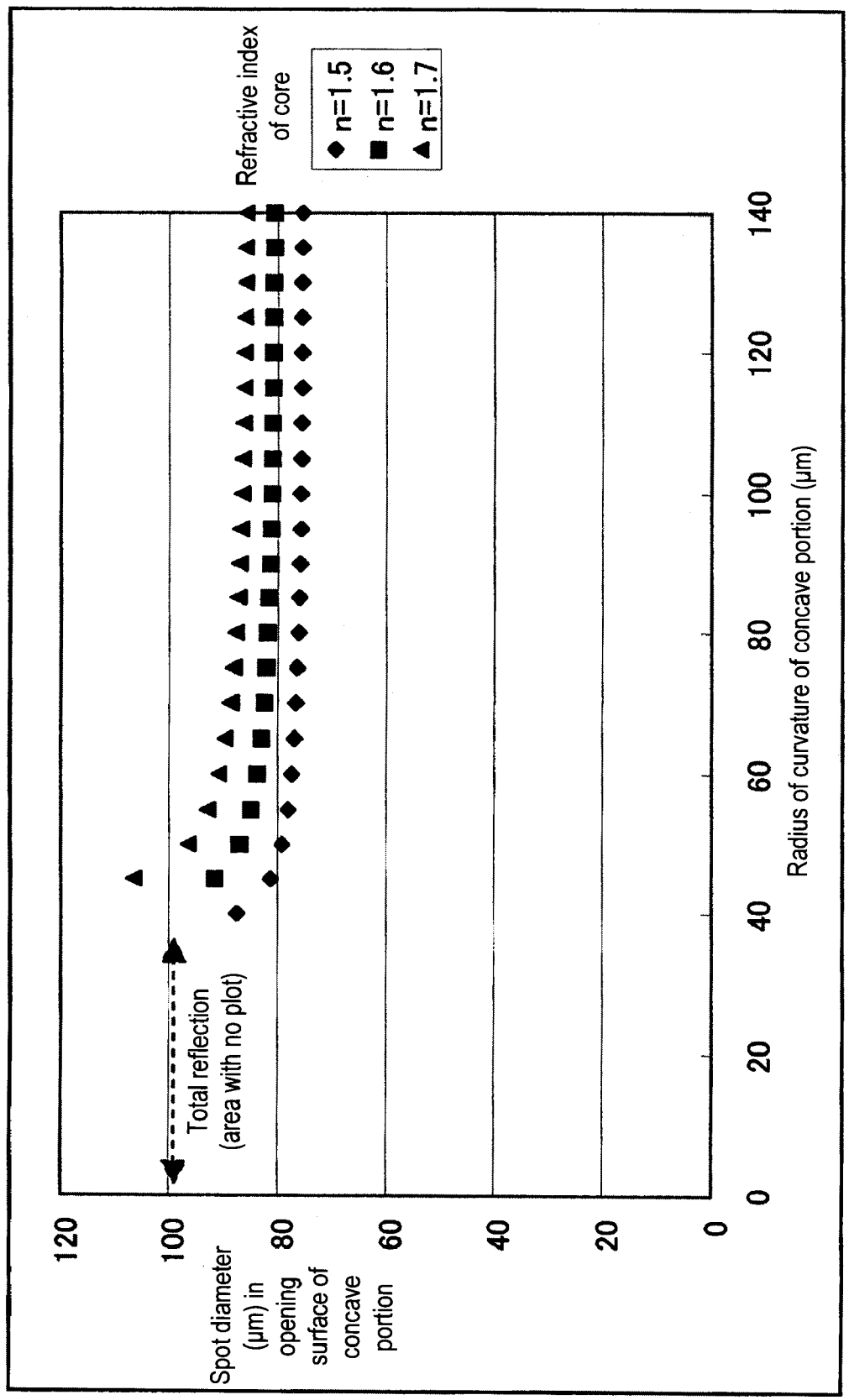
FIG. 9 is a graph showing an example of a relationship between a radius of curvature of the concave portion and a spot diameter in an opening surface of the concave portion.

FIG. 9 is a graph showing an example of a relationship between a radius of curvature of the concave portion and a spot diameter in an opening surface of the concave portion. In this example, FIG. 9 shows the cases in which a refractive index of the core 3 of the optical waveguide 6 is n=1.5, n=1.6 and n=1.7, respectively. As is apparent from the graph, an effect for increasing the spot diameter is enhanced as the radius of curvature of the concave portion is reduced. When the concave portion is not provided, the spot diameter is 50 μm, which is equal to the core diameter. In the case where a concave portion having a radius of curvature of 40 to 140 μm is provided, the spot diameter can be increased to be equal to or greater than 70 μm and is considerably increased as compared with the case in which no concave portion is provided.

It is assuming that (a light receiving diameter for suppressing the space-charge effect)≦(a spot diameter×2). If no concave portion is provided, the spot diameter is 50 μm. Therefore, the light receiving diameter is equal to or smaller than 50 μm×2=100 μm. On the other hand, in the exemplary embodiment, the spot diameter of the opening surface of the concave portion can be set to be 78 to 100 μm, for example, as shown in FIG. 9. In this case, therefore, the light receiving diameter is equal to or smaller than (78 to 100) μm×2=156 to 200 μm when the light receiving surface of the light receiving element is put on the opening surface of the concave portion. More specifically, an upper limit of the light receiving diameter is greater than that in the case in which no concave portion is provided. Thus, a selection range of the light receiving element is expanded. The light receiving element (for example, a photodiode) having a large light receiving diameter is inexpensive, and a degree of freedom of selecting the light receiving element can be increased according to the intended use.

What is claimed is:

1. An optical transmission apparatus comprising:
   a light receiving element that receives light; and
   an optical waveguide including
      a core,
      a clad that is adjacent to the core, and
      a concave portion that is formed in a portion of the clad and diffuses the light,
wherein
   the portion of the clad emits the light toward the light receiving element,
   an end portion of the core has an inclined surface, and
   the concave portion is formed in the portion of the clad, which emits the light reflected by the inclined surface of the core.

2. The optical transmission apparatus according to claim 1, wherein the concave portion is formed in an end portion of the clad that emits the light.

3. The optical transmission apparatus according to claim 1, wherein a size of an opening surface of the concave portion is larger than that of a light receiving surface of the light receiving element.

4. The optical transmission apparatus according to claim 1, wherein the portion of the clad including the concave portion is a lens through which light is emitted from the optical waveguide.

5. An optical transmission apparatus comprising:
   a light receiving element that receives light; and
   an optical waveguide including
      a core,
      a clad that is adjacent to the core, and
      a concave portion that is provided in a portion of the clad and is concave toward the core, wherein
   the portion of the clad emits the light toward the light receiving element,
   an end portion of the core has an inclined surface, and
   the concave portion is formed in the portion of the clad, which emits the light reflected by the inclined surface of the core.

6. The optical transmission apparatus according to claim 5, wherein a size of an opening surface of the concave portion is larger than that of a light receiving surface of the light receiving element.

7. The optical transmission apparatus according to claim 5, wherein the portion of the clad including the concave portion is a lens through which light is emitted from the optical waveguide.

8. An optical transmission apparatus comprising:
   a light receiving element that receives light;
   a light emitting element that emitting the light; and
   an optical waveguide including
      a core,
      a clad that is adjacent to the core,
      a concave portion in one end thereof, the concave portion that diffuses the light, and is provided in a portion of the clad, wherein the portion of the clad emits the light toward the light receiving element, an end portion of the core has an inclined surface, and the concave portion is formed in the portion of the clad, which emits the light reflected by the inclined surface of the core, and
      a light receiving surface in the other end thereof, wherein the light receiving surface receives the light from the light emitting element.

9. The optical transmission apparatus according to claim 8, wherein the portion of the clad including the concave portion is a lens through which light is emitted from the optical waveguide.

* * * * *